Dec. 17, 1929.  H. E. ALLEN ET AL  1,739,936
METHOD AND APPARATUS FOR FORMING SHEET GLASS
Filed Feb. 1, 1923
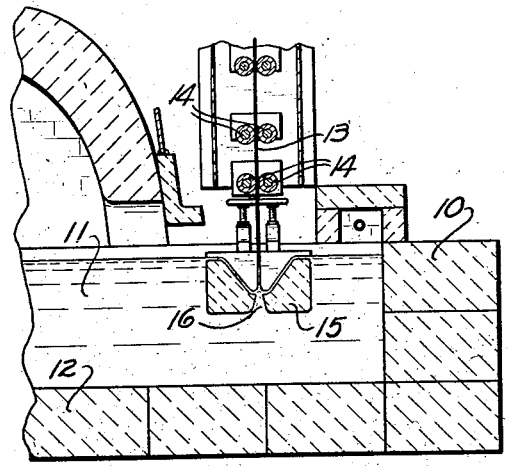
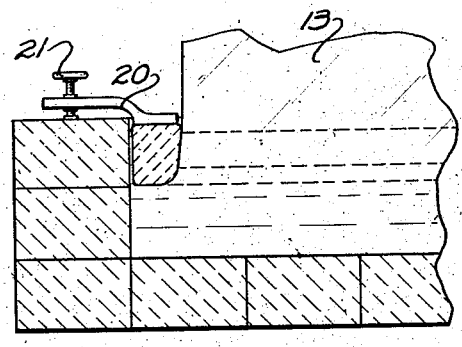
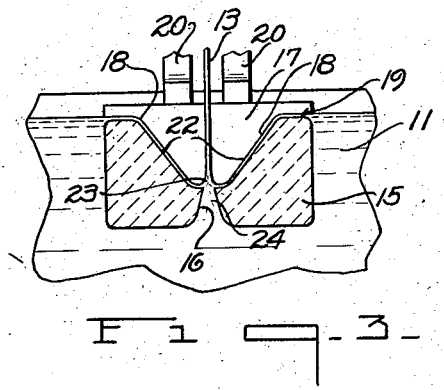
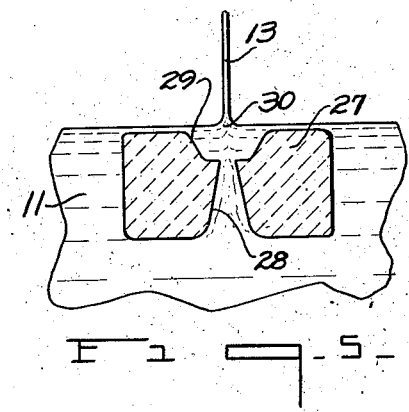
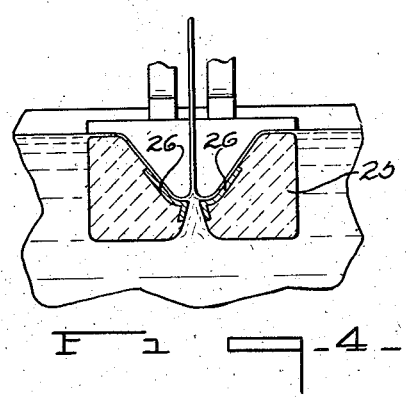
Inventor
Horace E. Allen
Wilbur F. Brown
By Frank Fraser
Attorney Patented Dec. 17, 1929

1,739,936

UNITED STATES PATENT OFFICE

HORACE E. ALLEN AND WILBUR F. BROWN, OF TOLEDO, OHIO, ASSIGNORS TO LIBBEY-OWENS GLASS COMPANY, OF TOLEDO, OHIO, A CORPORATION OF OHIO

METHOD AND APPARATUS FOR FORMING SHEET GLASS

Application filed February 1, 1928. Serial No. 251,031.

The present invention relates to sheet drawing apparatus and has particular reference to that type of machine wherein the sheet of glass is drawn through a slot formed in a suitable member, the said member being disposed in a source of molten glass.

One of the primary objects of this invention is to provide means for eliminating or reducing defects on the surface of the glass.

Another object of the invention is to improve the character of the surface of the glass sheet being drawn.

Still another object of this invention is to provide sheet glass drawing apparatus employing a deputer so constructed and manipulated that a meniscus is provided, the molten glass therefor being supplied by three separate streams.

Another object of the invention is to provide means wherein the glass forming the outer surface of the drawn sheet is furnished by a surface flow of glass to the meniscus whereby the formed sheet will be free of the so-called "water silk" lines or other surface defects.

Still another object of the invention is to provide sheet drawing means of this character employing a deputer so constructed and manipulated that a meniscus is formed by the combined flow of two streams of molten glass downwardly from opposite directions together with an upwardly flowing stream flowing under a hydrostatic head.

Still another object of the invention is to provide a deputer of this character wherein the shelves of the deputer are covered with a material formed of a non-corrosive alloy whereby the solvent action of the glass on the shelves with respect to the meniscus, is eliminated.

Various other objects, advantages and novel details of construction of this invention will be made more apparent as this description proceeds, especially when considered in connection with the accompanying drawings wherein:

Figure 1 is a fragmentary vertical longitudinal sectional view through a sheet drawing apparatus constructed in accordance with this invention.

Figure 2 is a fragmentary transverse vertical sectional view through the structure illustrated in Figure 1.

Figure 3 is an enlarged vertical sectional view through the deputer.

Figure 4 is a similar view of a slightly modified form of construction and

Figure 5 is a similar view of still another modified form of construction.

Referring now to the drawings and more particularly to Figure 1 thereof it will be noted that there is illustrated a draw pot or working receptacle 10 which may be supplied with a suitable source of molten glass 11 in any preferred or desired manner, as for instance, by means of a continuous tank furnace 12. In accordance with the type of machine herein disclosed the sheet of glass 13 is drawn vertically from the draw pot 10 and passes between rollers 14. In order to permit a continuous drawing of glass from the pot 10 a member 15, which is known in the art as a deputer, is submerged in the molten glass 11 and is provided with a longitudinal slot 16 through which the glass sheet 13 is drawn. Ordinarily the deputer 15 is formed of a refractory material, which has a tendency to create a drag on the sheet being drawn due to the tendency of the glass to adhere to such material. In this manner a sheet of glass can be continuously drawn from a source of molten glass.

An object of the invention is to eliminate the possibility of lines and other surface defects being formed in the sheet as it passes upwardly from the slot 16 of the deputer. In order to accomplish this we propose submerging the deputer so that a surface flow of glass to the meniscus will occur. In order to obtain these results we propose forming a longitudinally extending recess 17 in the top surface of the deputer, the longitudinal side walls 18 thereof being inclined downwardly to points adjacent the slot 16. It will be noted that the slot 16 opens into the longitudinally extending recess 17 and that the upper end of this slot is considerably below the top face 19 of the deputer.

Any desired or preferred means may be employed for mounting and adjustably supporting the deputer but in the form of construction herein illustrated the deputer is shown as provided with extensions or arms 20 at the ends thereof provided with adjusting means 21 engaging the wall of the draw pot or some other suitable support. By properly adjusting the means 21 the deputer can be raised and lowered as desired.

In practice it is proposed to submerge the deputer 15 in the molten glass 11 sufficiently to bring its upper surface 19 slightly below the level of the molten glass 11. In this manner two streams of molten glass 22 are created and caused to flow by gravity downwardly over the downwardly inclined faces 18 of the recess 17 and to unite at a point substantially coincident with the slot 16 and to co-operate to produce the meniscus 23. At the same time a stream 24 of molten glass is caused to flow upwardly through slots 16 by reason of hydrostatic head pressure of the molten glass 11. This stream 24 co-operates with the two streams 22 to create the meniscus 23 from which the sheet 13 is formed.

It will be noted that the top surface of streams 18 flow into and form the outer surface of the formed sheet 13 and that these surfaces remain out of contact with the deputer so that the glass forming the outer surface of the drawn sheet does not come in contact with the deputer and as a consequence will be free from lines or other surface defects.

It is believed that the so-called "water silk" lines, which are frequently present on the surface of glass produced in the manner herein described, result from the solvent action of the small amount of glass which accumulates and is present on the shelves of the deputer from which the meniscus rises. This glass usually contains a relatively large amount of alumina and we propose preventing such an accumulation of this glass relatively high in alumina whereby to prevent the formation of these "water silk" lines in the final sheet. In this connection reference is made to Figure 4 wherein the deputer 25 which is substantially identical in construction with the previously described deputer 15 is provided with members 26 formed preferably of some non-corrosive alloy, these members being arranged to fit and cover the shelves of the deputer. In other respects this construction of deputer functions as does the previously described one.

In Figure 5 the deputer 27 is provided with a slot 28 extending upwardly and opening into the bottom of a relatively shallow recess 29. In this form of construction the deputer will be submerged below the level of molten glass 11, whereby molten glass will fill the relatively shallow recess 29, a stream of molten glass being forced up through slot 28 by reason of hydrostatic head or pressure of the molten glass 11. The present construction and method of operation differs from those previously described in that the deputer is submerged sufficiently far to have the meniscus 30 start on the level of the glass in the draw pot. However, as in the previously described form, the molten glass flowing into the outer surface of the sheet 13 does not come in contact with the deputer.

Obvious modifications of the present invention will suggest themselves to others skilled in this art and to this end reservation is made to make such changes in many of the essential and all of the non-essential details of construction and method of operation as may come within the purview of the accompanying claims.

We claim:

1. In the method of forming sheet glass, those steps which consist in forming a meniscus by a combined flow of glass downwardly from opposite directions and a hydrostatic flow.

2. In the method of forming sheet glass, those steps which consist in creating two streams of molten glass by gravity flow and creating a stream by hydrostatic pressure, which streams unite to form the meniscus of the sheet.

3. In the method of forming sheet glass, those steps which consist in creating a hydrostatic flow and a surface flow of molten glass and drawing a sheet of glass from the union of these streams.

4. In the method of forming sheet glass those steps which consist in creating a meniscus by flowing streams of molten glass thereto which form the surfaces of the sheet and supplying additional molten glass thereto by a hydrostatic head.

5. The method of forming sheet glass which comprises, flowing streams of molten glass downwardly from opposite directions in contact with a deputer and flowing a stream of molten glass upwardly under a hydrostatic head through the center of the deputer, as and for the purpose set forth.

6. The method of forming sheet glass which comprises, flowing streams of molten glass downwardly in opposite directions in contact with a deputer and flowing a stream of molten glass upwardly under a hydrostatic head through the center of the deputer and drawing a sheet of glass from the united streams.

7. The method of forming sheet glass which comprises, flowing streams of surface molten glass downwardly from opposite directions in contact with a deputer and flowing a stream of molten glass upwardly under a hydrostatic head through the center of the deputer, uniting the streams and drawing a sheet of glass from the united streams whereby the surface glass forms the surface of the sheet.

8. In the method of forming sheet glass, those steps which consist in creating two streams of molten glass by gravity flow, maintaining one surface of said streams free from contact, creating a stream by a hydrostatic head and drawing a sheet from the union of said streams.

9. In the method of forming sheet glass, those steps which consist in creating two streams of molten glass by gravity flow, maintaining one surface of said streams free from contact, creating a stream by a hydrostatic head, uniting the streams to create a meniscus from which a sheet of glass is drawn, the surfaces of the streams which were maintained free from contact forming the surfaces of the drawn sheet.

10. In the method of forming sheet glass, those steps which consist in creating two streams of molten glass by gravity flow, maintaining one surface of said streams free from contact, creating a stream by a hydrostatic head, uniting the streams and drawing a continuous sheet of glass therefrom, the uncontacted surfaces of the said gravity flowed streams constituting the surfaces of the formed sheet.

11. The combination with sheet glass drawing apparatus, of a deputer provided with a slot through which a stream of glass is flowed by hydrostatic pressure and means whereby surface glass may be flowed and directed to unite with said first stream to form a meniscus from which the sheet is drawn.

12. The combination with sheet glass drawing apparatus, of a deputer provided with a longitudinal vertically extending slot, a recess formed in the upper face of said deputer, said slot opening into the bottom of said recess and means for submerging said deputer into a mass of molten glass whereby a stream of glass under hydrostatic pressure will flow through said slot and surface glass will be directed by said recess toward said first stream and united therewith to form a source from which a sheet of glass may be continuously drawn.

Signed at Toledo, in the county of Lucas, and State of Ohio, this 30th day of January, 1928.

HORACE E. ALLEN.
WILBUR F. BROWN.